United States Patent [19]
Krengel et al.

[11] Patent Number: 5,860,204
[45] Date of Patent: Jan. 19, 1999

[54] CONTINUOUS TUBE FORMING AND COATING

[75] Inventors: Theodore H. Krengel, Flossmoor, Ill.; John J. Borzym, Birmingham, Mich.

[73] Assignee: The Idod Trust, Warren, Mich.

[21] Appl. No.: 775,634

[22] Filed: Dec. 31, 1996

Related U.S. Application Data

[62] Division of Ser. No. 83,099, Jun. 24, 1993, Pat. No. 5,651,819.

[51] Int. Cl.$^6$ ...................................................... B23P 11/00
[52] U.S. Cl. ............................ 29/460; 29/527.4; 427/425; 427/433
[58] Field of Search .................................. 29/460, 527.2, 29/527.4; 427/424, 425, 432, 433, 434.4, 434.7; 219/59.1, 61, 61.2; 228/17.5, 40, 173.4

[56] References Cited

U.S. PATENT DOCUMENTS

| | | | |
|---|---|---|---|
| 2,194,565 | 3/1940 | Moss . | |
| 2,393,678 | 1/1946 | Graham . | |
| 2,536,186 | 1/1951 | Keller . | |
| 2,771,669 | 11/1956 | Armstrong et al. . | |
| 3,060,889 | 10/1962 | Knapp . | |
| 3,073,019 | 1/1963 | Caplan et al. . | |
| 3,256,592 | 6/1966 | Krengel . | |
| 3,270,364 | 9/1966 | Steele . | |
| 3,354,864 | 11/1967 | Knapp . | |
| 3,459,587 | 8/1969 | Hunter et al. . | |
| 3,611,986 | 10/1971 | Pierson . | |
| 3,681,118 | 8/1972 | Ohama et al. . | |
| 3,707,400 | 12/1972 | Harvey et al. . | |
| 3,716,906 | 2/1973 | Troughton | 29/460 |
| 3,736,174 | 5/1973 | Moyer . | |
| 3,768,145 | 10/1973 | Ostrowski | 29/460 X |
| 3,908,593 | 9/1975 | Rossi et al. . | |
| 3,917,888 | 11/1975 | Beam et al. . | |
| 3,965,551 | 6/1976 | Ostrowski | 29/460 X |
| 4,287,238 | 9/1981 | Stavros . | |
| 4,768,280 | 9/1988 | Palmer et al. . | |
| 4,954,682 | 9/1990 | Baran et al. . | |
| 5,066,419 | 11/1991 | Robertson . | |
| 5,101,758 | 4/1992 | Souter et al. . | |
| 5,140,123 | 8/1992 | Mitani . | |

*Primary Examiner*—S. Thomas Hughes
*Attorney, Agent, or Firm*—Howard & Howard

[57] ABSTRACT

An improved continuous tube forming and coating process and apparatus, wherein the tube is preferably formed and welded with the seam located at the bottom of the tube. One surface of the strip is coated with a paint or other protective coating and the open seam tube is formed with the painted surface on the inside of the tube. An improved coating applicator and impeder is disclosed which coats the inner surface of the seam following welding preferably in an inert atmosphere. The improved impeder includes an outer annular chamber adjacent the casing which includes one or more ferrite rods and circulating coolant and an inner axial paint applicator tube having a free end which extends through the impeder casing having a nozzle which applies a protective coating over the seam, preferably located in the lower portion of the tube. In one preferred embodiment of the impeder, an inert gas passage surrounds the paint applicator tube. An improved galvanizing apparatus is also disclosed having a sealed galvanizing tank which receives the seamed tube below the level of the molten zinc and which is enclosed within a sealed housing and wherein the inert gas pressure in the galvanizing tank is greater than the inert gas pressure in the housing. The galvanizing apparatus includes improved inert gas seals which may be also used to shape the molten zinc on the tube leaving the housing.

12 Claims, 5 Drawing Sheets

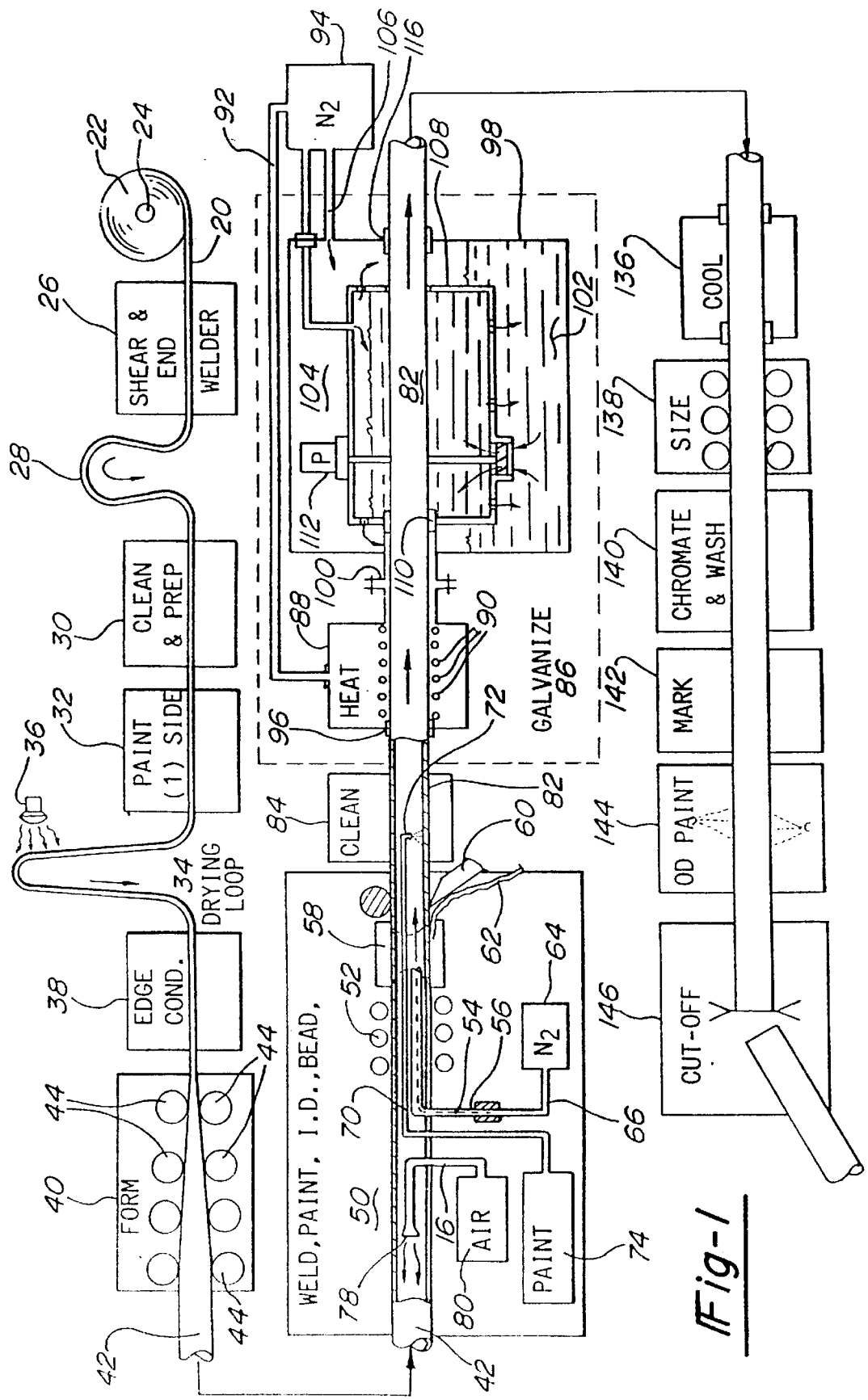

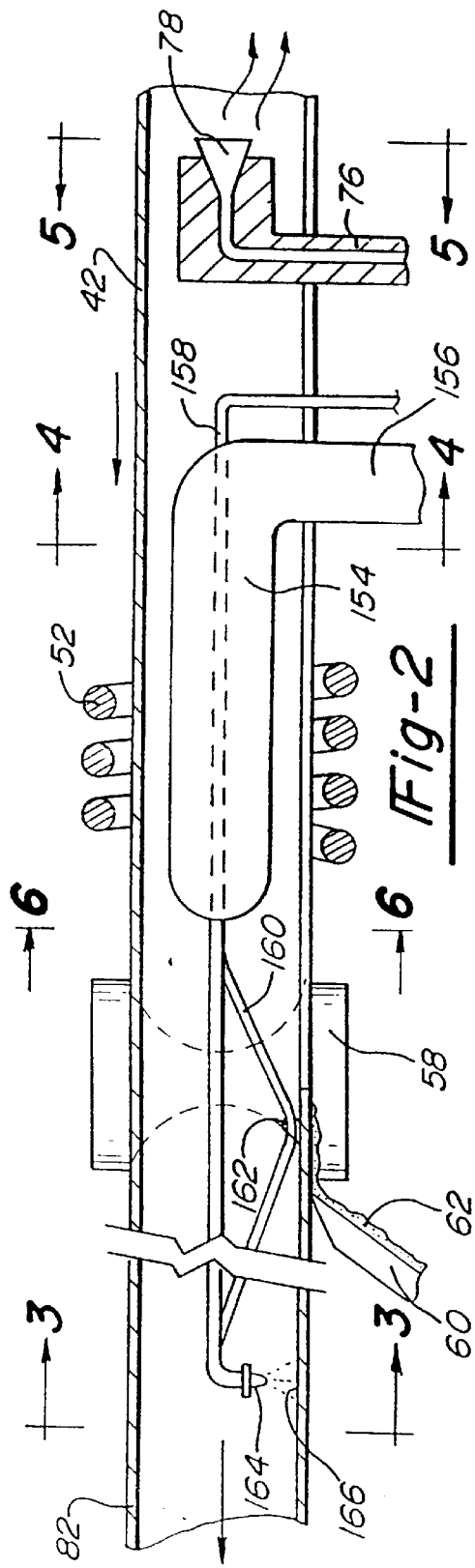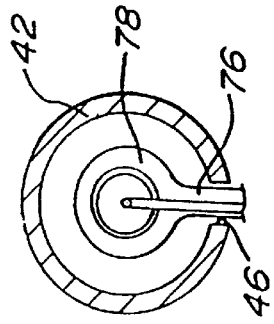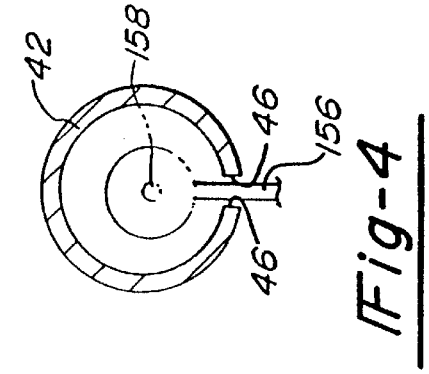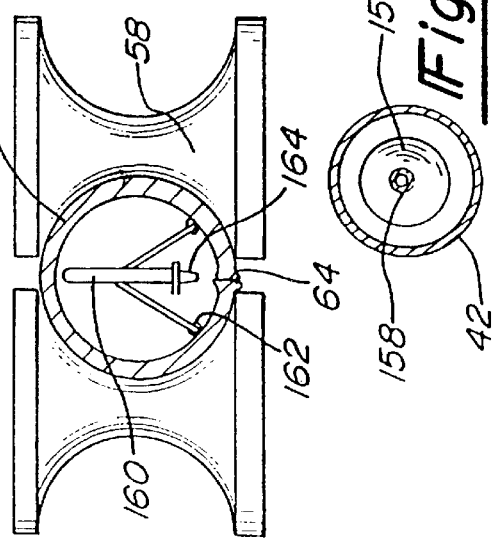

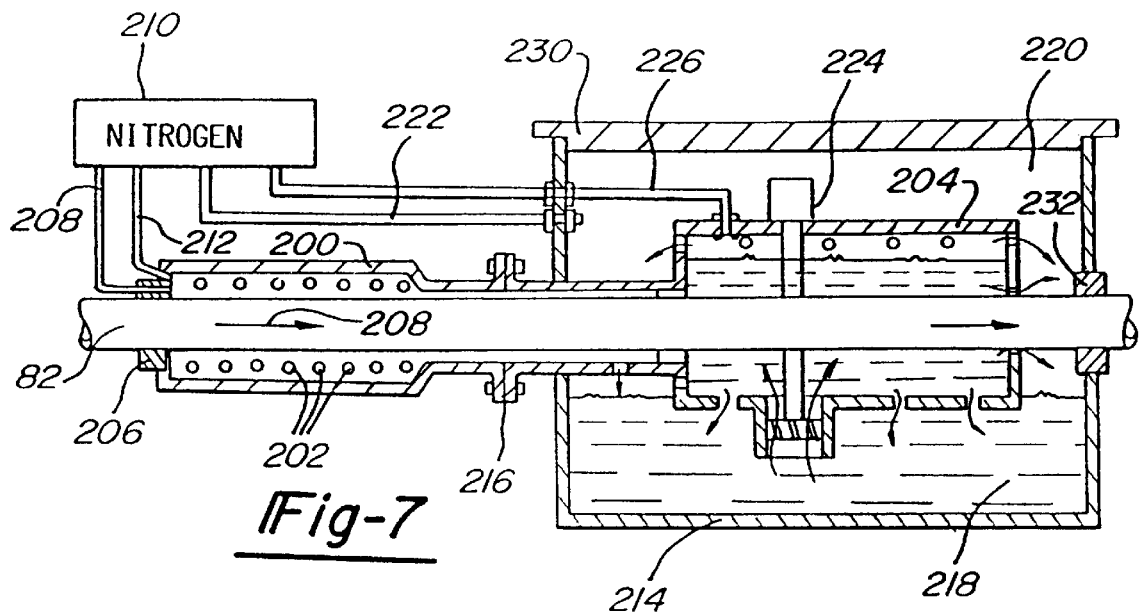
Fig-7
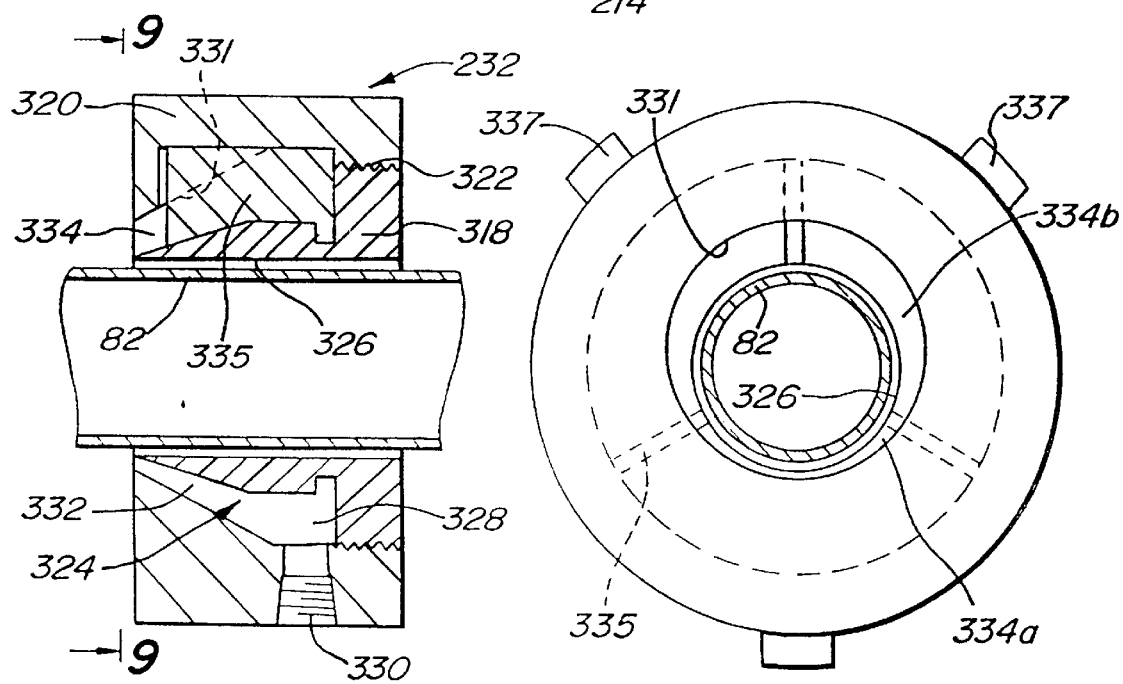
Fig-8
Fig-9

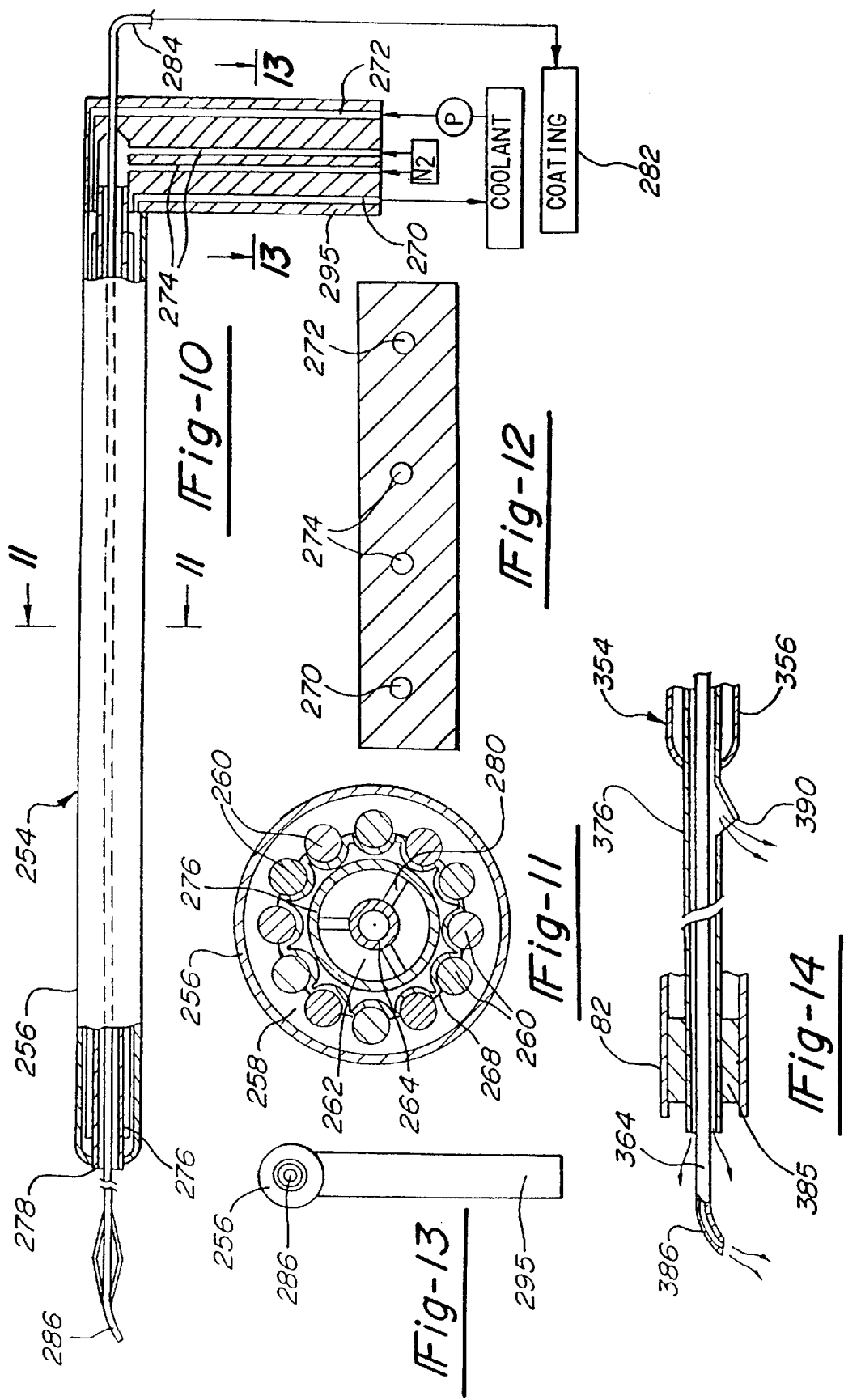

CONTINUOUS TUBE FORMING AND COATING

This is a divisional of application Ser. No. 08/083,099 filed on Jun. 24, 1993, now U.S. Pat. No. 5,651,819.

The present invention relates to an improved process and apparatus for continuously forming a seamed metal tube. More particularly, the present invention relates to improvements in forming a seamed metal tube having a coated inner surface, an improved external galvanizing tank, and improvements in induction tube welding impeders.

BACKGROUND OF THE INVENTION

Methods of continuously or in-line forming a seamed metal tube from a continuous strip or skelp are well known. After cleaning and edge conditioning of the strip, if required, the skelp is rolled to form an open seam tube having nearly abutting edges at the top of the tube. The edges are then welded together by one of several methods which generally include heating the edges and either forging the edges together with squeeze rolls and/or continuous flux welding. The edges of the tube may be heated for example by resistance welding, an electric arc or by high frequency induction welding. High frequency welding is a form of electric resistance welding, wherein the open seam tube is received through an electric coil which creates a strong magnetic field, which in turn induces current to flow around the tube. An impeder is generally located within the tube which forces the current flow down the nearly abutting edges of the open seam tube, heating the tube edges to a hot forging temperature. The tube edges are then forged by squeeze rolls which drive the molten edges together to form an integral seam.

In-line galvanizing and coating or painting processes are also well known. The strip or skelp may be galvanized or painted on one or both surfaces prior to forming and welding or the welded seamed tube may be galvanized by immersion in a molten zinc bath.

Where the strip is coated with a protective coating prior to seam welding, the coating will burn off or melt in the seam zone because the welding operation involves the melting of the tube material, which is generally steel. Thus, the welding temperature may be 2,300° F. or greater. Where the strip has been painted, the paint will burn off in the weld zone. Where the strip is coated with a metal, such as zinc or aluminum, the metal will melt and flow downwardly away from the seam, which is located at the top of the tube. A zinc coating solution has also been used to paint the exterior surface of the seam. However, such a coating is primarily cosmetic and has poor adhesion. The failure of present processes to fully coat and thus protect the tube seam is evident by the fact that the weld area is generally the first to fail in accelerated corrosion tests. Thus, there has been a long-felt need to provide an improved coating process, particularly on the seam.

Further, the art has long recognized the advantages of galvanizing ferrous tubing in an inert atmosphere, such as nitrogen. Maintaining a reducing or nonoxidizing atmosphere within the galvanizing tank improves the resultant zinc coating, reduces oxidization or rust and waste, including slag. However, the prior art has failed to develop a commercially acceptable galvanizing apparatus which can be serviced and which maintains an inert or nonoxidizing atmosphere, particularly during service.

The continuous tube forming and coating process and apparatus of this invention solves the above-identified problems and produces a superior coated tube. The process of this invention assures a fully coated inner seam and an improved galvanized exterior tube surface.

SUMMARY OF THE INVENTION

As set forth above, the present invention relates to an improved continuous tube forming and coating process and apparatus. The disclosed process includes an improved continuous method of forming a seamed metal tube having a coated inner surface from a continuous moving metal strip or skelp. The improved process includes applying a coating to at least one surface of the strip, then continuously rolling and forming the strip into a tube-shaped strip or open seam tube having the coated surface located on the inner surface of the tube and the strip lateral edges located in a lower portion of the tube. The process then includes heating and continuously integrally bonding or welding the edges of the tube-shaped strip together to form an integrally seamed tube. The process then includes applying a coating to at least an inner surface of the seam by locating a coating applicator between the spaced edges of the tube-shaped strip having a coating application nozzle located downstream of the weld which projects downwardly toward the tube seam and sprays the coating downwardly onto the seam, coating the seam. Thus, the "upside down" orientation of the lateral edges of the tube-shaped strip in a lower portion of the open seam tube results in a significant advantage in the final paint application because excess coating material will flow downwardly over the seam and the liquid coating will saturate the roughened seam, forming a good adhering coating, particularly as compared with the present processes, wherein the seam is located at the top of the tube.

In the most preferred process of this invention, the lateral edges of the open seam tube are bonded by high frequency induction welding, wherein the strip edges are heated by a high frequency alternating current and an improved impeder is located within the tube. The improved impeder disclosed herein includes a bracket support extending downwardly between the opposed edges of the open seam tube and a body portion or casing which extends axially within the tube, opposite the induction coil. The paint applicator wand preferably extends through the axis of the body portion of the impeder, inside an annular outer chamber which includes the ferrite rod or rods. The preferred embodiment of the improved impeder is liquid cooled and includes an outer annular chamber which contains the ferrite rods and the circulating liquid coolant. The paint applicator rod then extends through the impeder and downstream in the tube to a nozzle, which preferably projects downwardly to spray a protective coating or paint over the seam. In the most preferred embodiment of the impeder, the paint tube extends through the axis of the impeder body portion and a gas annular passage surrounds the paint tube, inside of the outer ferrite annulus. An inert gas, such as nitrogen, is circulated through the inner annulus to flood the weld, which also further protects the paint tube from overheating.

The method of this invention may further include coating the exterior of the tube with metal, such as zinc, by immersing the moving tube in molten metal. As will now be understood, the location of the seam in the lower portion of the tube thus assures better coating of the seam when the tube emerges from the molten metal bath. That is, the molten metal flows downwardly over the seam, fully coating the seam.

The improved galvanizing bath of this invention provides a substantially inert atmosphere for the coating of the external surface of the tube and is specifically designed for continuous or in-line operation. For ease of description, the term "galvanizing" is used to describe coating the tube with zinc or other molten metal including aluminum. The term "inert atmosphere" is used herein to describe an atmosphere which is inert to the process, which may be created by reducing air by substantially eliminating oxygen or introducing an inert gas, such as nitrogen, sometimes referred to herein as a "non-oxidizing atmosphere" and the gas as a "non-oxidizing gas". The galvanizing bath includes a sealed housing assembly having a lower reservoir of molten zinc and an upper chamber. A sealed galvanizing tank is located within the sealed housing assembly. Molten zinc is pumped from the reservoir of the housing assembly into the galvanizing tank and the housing and galvanizing tank include coaxially aligned inlets and outlets which receive the tube to be coated beneath the level of the molten zinc in the galvanizing tank. Inert gas, preferably nitrogen, is introduced under pressure separately into the sealed housing assembly and the separately sealed galvanizing tank. The relative pressures are then controlled, such that the inert gas pressure in the housing assembly is less than the pressure in the galvanizing tank and preferably grater than the housing. This improvement not only assures a substantially inert atmosphere in the galvanizing tank, but also permits limited access to the sealed housing assembly for service, including replenishing the zinc and maintenance.

The preferred embodiment of the galvanizing bath apparatus of this invention includes a separate sealed preheat chamber wherein the tube is heated to near the temperature of the molten zinc. An inert gas is introduced under pressure into the preheat chamber, preferably to maintain a pressure which is less than the pressure of the inert gas in the galvanizing tank. Inert gas leakage through the inlet and outlet of the galvanizing tank and the housing assembly is preferably reduced by the improved wiper nozzle assembly of this invention. In the disclosed tube forming and coating process of this invention, annular wiper nozzles are provided to reduce inert entry of an oxidizing gas and which may also be used to control the configuration of the zinc coating on the external surface of the tube.

The improved wiper nozzle of this invention directs gas under pressure axially over an outer surface of the tube, which moves axially through the wiper nozzle. The wiper nozzle includes an axial bore which closely receives the tube and an annular gas chamber which extends axially around the bore. The annular gas chamber includes an inlet chamber spaced from the bore having a gas inlet and an outlet chamber which tapers axially and radially inwardly toward the bore which includes an annular outlet surrounding the tube having a radial width substantially less than the radial width of the inlet chamber directing gas under pressure axially and radially inwardly over the tube. In the continuous tube forming and galvanizing process of this invention, an inert gas, preferably nitrogen, is received under pressure in the inlet chamber and an annular jet of gas is directed radially inwardly and axially over the tube, preferably counter to the direction of movement of the tube. Where the wiper nozzle is located at the inlet to the galvanizing tank, for example, the gas reduces the entry of an oxidizing gas, such as oxygen which might otherwise be carried with the tube into the galvanizing tank.

The wiper nozzle of this invention may also be utilized to shape the molten zinc on the exterior of the tube. For example, the annular exit or outlet of the wiper nozzle may be oriented eccentrically, such that the pressure on the lower portion of the tube is greater than the pressure on the upper portion of the tube, such that a greater proportion of the molten zinc on the tube is wiped away in the lower portion of the tube, than the upper portion of the tube. As the tube continues out of the galvanizing apparatus, gravity will even out the thickness of the zinc coating at the top and bottom of the tube, providing a more uniform coating for the tube. Where the shaping nozzle is located at the outlet of the galvanizing tank enclosure, an inert gas is used. Alternatively, the shaping nozzle may be located outside the galvanizing tank in a separate enclosure, in which case air is used. Zinc coatings on in-line galvanizing tube mills are now generally greater in the lower portion of the tube than the upper portion.

Other advantages and meritorious features of the continuous tube forming and coating process and apparatus of this invention will be more fully understood from the following description of the preferred embodiments, the claims and the drawings, a brief description of which follows.

BRIEF DESCRIPTION OF THE DRAWINGS

FIG. 1 is a schematic flow diagram illustrating a preferred embodiment of the continuous tube forming and coating process of this invention;

FIG. 2 is a side cross-sectional view of a second embodiment of a tube welding and seam painting station;

FIG. 3 is a side cross-sectional view of FIG. 2, in the direction of view arrows 3—3;

FIG. 4 is an end cross-sectional view of FIG. 2, in the direction of view arrows 4—4;

FIG. 5 is an end cross-sectional view of FIG. 2, in the direction of view arrows 5—5;

FIG. 6 is an end view of the impeder shown in FIG. 2 in the direction of view arrows 6—6;

FIG. 7 is a side partially cross-sectioned and schematic view of a further embodiment of an improved galvanizing bath apparatus;

FIG. 8 is a cross-sectional view of an improved gas shaper seal;

FIG. 9 is an end cross-sectional view of the gas seal shown in FIG. 8, in the direction of view arrows 9—9;

FIG. 10 is a side partially cross-sectioned view of an alternative embodiment of the improved impeder of this invention;

FIG. 11 is an end cross-sectional view of the impeder shown in FIG. 10, in the direction of view arrows 11—11;

FIG. 12 is a cross-sectional view of the impeder mounting bracket shown in FIG. 10, in the direction of view arrows 12—12;

FIG. 13 is an end view of the impeder shown in FIG. 10;

FIG. 14 is a side partially cross-sectioned view of an alternative embodiment of the impeder assembly shown in FIG. 10;

Figure 15:
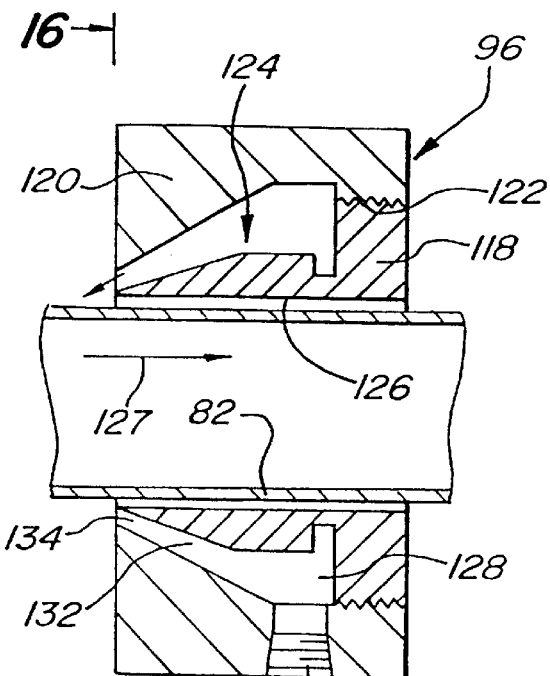
FIG. 15 is a side cross-sectional view of a gas seal.

DESCRIPTION OF THE PREFERRED EMBODIMENTS OF THE TUBE FORMING AND COATING PROCESS AND APPARATUS OF THIS INVENTION

Referring now to the partially schematic flow diagram of FIG. 1, it will be noted that the tube forming and coating process and apparatus of this invention are particularly, but not exclusively adapted for processing of endless lengths of untreated strip steel, such is normally processed by a continuous tube forming mill. The improvements described herein can also, however, be used with precoated or galvanized strip and certain improvements may also be used in a batch or noncontinuous process.

Metal strip, preferably strip steel, 20 is supplied to the tube forming mill in coils, which are mounted on a pay-out reel 24. The coil 22 is mounted for free rotation on the reel 24 as required by a continuous tube forming mill. As will be understood by those skilled in the art, the strip steel is processed by the mill substantially continuously at a constant rate. The advancement of the flat strip or skelp 20 through the mill is effected primarily by engagement between the strip and the forming and sizing rolls which rotate at a relatively constant speed. The strip is thus drawn into the mill from the pay-out reel 24.

Because the length of each coil of strip steel is taken up by the mill in a relatively short time, a means must be provided for splicing the end of one coil to the next, which is accomplished at the splicing station 26. In the splicing station 26, the end of the reel being processed in the mill is sheared to provide a square end and welded to the end of the next reel. An accumulator 28 in the form of a loop is provided having sufficient length to continuously feed the strip to the mill, while the trailing end is held stationary for shearing and welding. The loop may be formed by feeding the strip over a series of rollers (not shown), which are mounted to freely rotate as is well known in the art. When the splice is complete, the strip is again paid-out over the accumulator rolls for the next splicing operation.

Because the strip, as received, normally includes oil and may include other contaminates, it is necessary to clean and prepare the strip prior to painting, welding and galvanizing, which in the disclosed process is accomplished at cleaning station 30. In a typical application, the strip is cleaned and prepared by a combination of alkaline and phosphate washes, with intermediate water rinses. In the present process, the strip is also dried. The cleaned strip is now ready for painting.

In the tube forming and coating process of this invention, at least the inside of the tube is coated with a protective coating or paint prior to welding the seam. However, as will be understood by those skilled in the art, the strip may be precoated as received on the reel 22. The protective coating or paint may be applied to one surface of the strip by any one of several known methods, including, for example, a paint curtain coating apparatus, a roller or the like. It should be noted, however, that only the flat surface is coated because the lateral edges of the strip should be free of paint. If the lateral edges of the strip are coated, the coating may interfere with the welding of the tube and should be removed in an edge treatment station. Following coating of the strip at station 32, the painted surface is dried usually by heating, which may be accomplished by the radiant heater 36 or other suitable means, including ultraviolet light. Further, a drying loop 34 is provided, such that the coating is fully dried prior to the next step in the process, which is edge conditioning. As will be understood, the preferred coating or paint will be depend upon the ultimate use for the seamed tube. A suitable ultraviolet curable paint or coating having improved slip quality or reduced friction for electrical conduits is available from PPG. Where the tube is used as a conduit for electrical wiring or the like, a conventional water based paint may be preferred. An ultraviolet lamp 36 may be preferred for drying ultraviolet sensitive paints.

In a conventional mill, the strip 20 preferably has a width which is slightly greater than required to form the tube, such that an edge is available on each side for proper sizing of the strip and to provide freshly cut metal at the abutting edges forming the seam. A conventional edge shaver may be used in the edge conditioning station 38 which may be used to cut a square edge. More preferably, a chamfered edge is provided to provide relief for the forged upset and assure good welding contact between the edges, as described below.

The flat metal strip or skelp is then rolled into a tube-shaped strip or open seam tube 42 having adjacent or nearly abutting lateral edges at the forming station 40. The metal strip 20 is progressively formed as it passes between rolls 44 which are rotatably supported on vertical and horizontal axles (not shown) in a conventional manner. However, in the continuous tube forming and coating process of this invention, the lateral edges of the strip are bent downwardly and inwardly toward one an other as the tube is formed, rather than upwardly as in a conventional tube forming mill. The lateral edges of the strip are then rolled into nearly abutting relation in the lower portion of the open seam tube 42, but the adjacent lateral edges 46 are slightly spaced, as best shown in FIGS. 4 and 5. The open seam tube 42 is then received in the weld and seam paint station 50, as now described.

The preferred embodiment of the tube welding apparatus of this invention utilizes high frequency induction to heat the opposed edges 46 of the tube. As shown in FIG. 1, the induction welding apparatus includes a work coil 52 which is connected to a source of high frequency alternating current. The work coil creates a strong magnetic field, which in turn induces current in the tube, adjacent the work coil. An impeder 54 is located within the open seam tube 42. A conventional induction welding impeder consists of a nonmetallic tube surrounding one or more ferrite rods. Water or mill coolant is circulated over and past the ferrite rod or rods to remove the heat produced by magnetic hysteresis and eddy current losses. At the frequencies used for induction welding (200–800 kHz), current flows around the tube and along the "Vee" formed by the approaching edges of the strip, heating the edges to a hot forging temperature, whereby the edges are at least partially melted. The edges are then forged together by the squeeze rolls 58 to form an integral seam as shown in FIG. 3. Where the strip is steel, the temperature of the edges will be about 2300° F., or greater. A conventional scarfing tool 60 then removes the flash 62 from the outer portion of the seam, and shown in FIG. 1. The impeder 54 includes a support or bracket portion 56 which extends downwardly between the opposed adjacent edges 46 of the open seam tube 42 and supports the impeder body portion 54 within the tube. In the preferred embodiment of the impeder, an inert gas, preferably nitrogen gas is injected under pressure through a port in the bracket 56 which communicates with an axial passage in the body portion 54 of the impeder, as shown by the dotted line in FIG. 1.

A source of nitrogen gas under pressure 64 is connected by line 66 to the impeder support or bracket 56. The free end of the impeder then includes an opening which floods the weld zone adjacent the squeeze rollers 58 with nitrogen gas. The preferred embodiment of the weld and seam paint station 50 further includes a coating applicator or paint wand which applies a protective coating to the inner surface of the seam. As described above, where the strip has been painted as shown at 32 in FIG. 1, the paint will burn off the weld zone because of the extreme temperatures induced in the nearly abutting edges of the open seam tube. The paint wand 70 extends upwardly between the opposed edges of the open seam tube, then axially over the impeder 54 to a coating application nozzle 72 which preferably projects downwardly to apply a coating or paint under pressure over the seam which is located in the lower portion of the tube. The paint wand 70 is connected to a source of paint under pressure 74.

Because the seam 64 is located in the lower portion of the tube, liquid coating material will flow downwardly over the seam to accumulate in the lower portion of the tube and saturate the roughened seam, forming a good adherent coating. This coating is superior to the coating achieved where the seam is located at the upper portion of the tube because surface tension draws the liquid paint downwardly away from the seam. Further, the nitrogen introduced over the weld reduces oxidation of the weld, producing a better surface for coating by the paint applicator. Finally, the preferred embodiment of the weld and paint applicator 50 of FIG. 1 includes a blower 76 having a nozzle 78 which blows air, or an inert gas into the tube, opposite to the direction of travel of the tube. The blower 76 is connected to a source of gas under pressure 80, such as a compressor. The blower dries the inner surface of the tube, prior to welding and blows any small debris through the space between the opposed edges of the tube downwardly, improving the general quality of the weld.

FIG. 2 illustrates a further improved embodiment of the impeder 154, wherein the paint applicator tube 158 extends axially through the impeder, as shown in FIG. 4. The trailing end 160 of the applicator tube extends out of the free end of the impeder 154. The paint tube 160 may be supported on skates 162. The free end of the tube includes a nozzle 164 which extends downwardly to spray the lower inner surface 166 of the seamed tube 82. The skates may be formed of any friction resistant material, such as nylon. The impeder 154 includes a support or bracket portion 156 which extends between the edges 46 of the open seam tube as shown in FIG. 4 and described above.

FIGS. 10 to 13 disclose a further preferred embodiment of the improved impeder assembly 254 of this invention. The improved impeder 254 includes an outer casing 256 formed of a nonmetallic, nonconductive magnetically permeable material. Inside the outer shell 256 is a first outer annular chamber 258 which contains ferrite rods 260, a second annular chamber 262 located inside the outer annular chamber 258 which receives an inert gas, and an innermost tube 264, which receives liquid coating material. As will be understood by those skilled in the art, the ferrite rods 260 are preferably located in close proximity to the casing 256. In the disclosed embodiment of the impeder, the ferrite rods 260 are arranged in a ring and radially spaced adjacent the shell 256. The ferrite rods are supported in a cradle 268 formed of a nonconductive, nonmetallic material. As shown in FIG. 12, the cradle which may be formed of a heat resistant thermoset plastic further divides the outer annular chamber 258 into an outer portion and an inner portion. Liquid coolant, which may be water or a light oil, is circulated around the ferrite rods and cradle by injecting the coolant under pressure into one of the ports 270 or 272 and out through the other port. An inert gas, preferably nitrogen is injected into the inner ports 274 into the second chamber 262, which is defined in the disclosed embodiment by tube 276, as shown in FIGS. 10 and 11. The inert gas tube 276 has an exit or outlet 278 at the free end of the impeder 254, as shown in FIG. 10. As shown in FIGS. 1 and 2, the free end of the impeder (54 in FIG. 1 and 154 in FIG. 2) is located adjacent the squeeze rolls 58, where the lateral edges of the tube-shaped strip are forged and welded together. The location of the weld in the bottom of the tube reduces the flash, particularly in thicker weld tubes, because the molten metal is not drawn downwardly. The introduction of a nonoxidizing or reducing gas at this location reduces the oxidation of the molten metal flash at the internal surface of the welded seam.

In the disclosed embodiment, the central axial paint tube 264 is supported on radial fins 280 preferably formed of a heat insulating material. As described above, the liquid paint or other liquid coating material is transmitted through a central axial tube 264 from a source of liquid coating material 282. In the disclosed embodiment, the liquid coating material is pumped through line 284 to axial tube 264, where it is transmitted to the nozzle assembly 286 at the free end of the tube 264. As will be understood by those skilled in the art, the tube welding location is a very hostile environment to a coating material, such as a water base paint. Thus, it is necessary to insulate the liquid paint from the hot ferrite rods 260 and the weld zone. The most preferred embodiment of the impeder shown in FIG. 10 insulates the paint tube 264 in a jacket of flowing nitrogen gas, which is contained in the second annular chamber 262 and the outer coolant chamber 258, which contains circulating liquid coolant. Thus, the paint tube is insulated from the hot ferrite rods and the weld zone, avoiding plugging of the paint tube. Further, the tube 264 extends downstream to a point where the weld has cooled sufficiently to accept the paint without burn-off.

Figure 17:
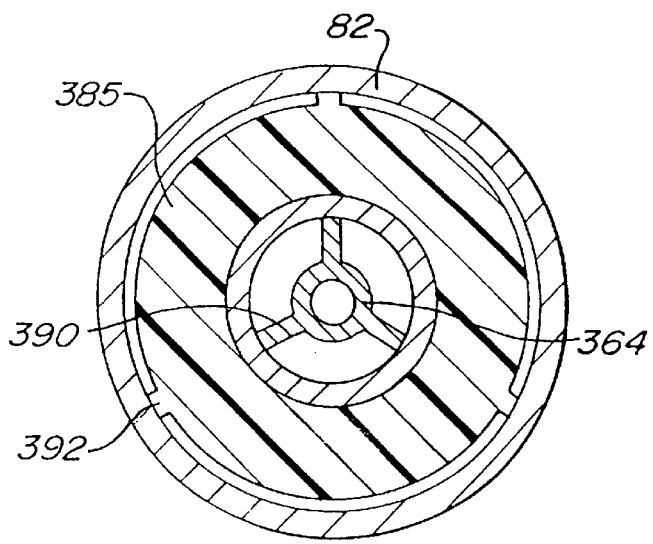
FIG. 17 is an end cross-sectional view of the busing seal shown in FIG. 14.

FIGS. 14 and 17 illustrate an alternative embodiment for the free end of the impeder assembly 354. Except as now described, the impeder 354 may be identical to the impeder 254 described above and similar elements are numbered in the same sequence. As shown, the inert gas tube 376 extends through the free end of the outer casing 356 and includes a first outlet 390 adjacent the free end of the impeder casing 356 which creates an inert atmosphere over the weld, reducing oxidation as described above. In this embodiment, however, the gas tube 376 extends to adjacent the nozzle or outlet 386 of the paint tube 364. Inert gas is thus flooded into the paint zone, displacing oxygen and reducing the likelihood of ignition of paint fumes. Further, the gas tube 376 provides a protective shroud over the paint tube to adjacent the outlet which, as described above, is located far downstream of the weld zone. Thus, the paint tube is substantially fully insulated. In most preferred embodiment, the free ends of the paint applicator tube 364 and the gas tube 376 are supported in the seamed tube 82 by a generally cylindrical bushing seal 385. As best shown in FIG. 17, the bushing seal 385 includes a plurality of radial runners 392 which engage the inner surface of the seamed tube 82, reducing friction. The gas tube 376 preferably extends through the bushing seal 385 as shown in FIG. 14 to provide a vapor thermal barrier between the paint zone, wherein the coating is applied by nozzle 386, and the weld zone which includes the impeder 354. The bushing seal 385 also reduces the draw-out of nitrogen from the tube. Paint tube 364 may be supported on radial support fins 390, as shown in FIG. 17. The bushing seal 385 is preferably formed of a nonmetallic reduced friction insulating thermoset plastic, such as a filled nylon and the radial support fins 390 may be formed on a nonconducting insulating fibrous material.

As described above, the support or bracket portion 295 extends downwardly from the body portion of the impeder 254, as shown in FIGS. 10 to 13, between the nearly abutting edges of the open seam tube 42, as shown in FIG. 1. The impeder shell 256 then extends downstream to the weld zone to induce a current in the tube, as described above. The improved impeder of this invention, however, provides multiple functions, including protecting the paint tube and supplying an inert gas to the weld zone and paint area, if required.

Following welding, the welded tube 82 enters a cleaning station 84, wherein the external surface of the weld is cleaned following scarfing. In a typical application, the welded seam is first cleaned and roughened with a rotating wire brush to remove scale, then cleaned with muriatic acid, which further removes any oxides, then thoroughly rinsed. The tube is now ready for external galvanizing, which occurs at the galvanizing station 86.

Prior to galvanizing, the tube is heated to a temperature approximating the temperature of the molten zinc in the galvanizing tank, or about 850° F. in the heat enclosure 88. Although any suitable means may be used to heat the tube, including, for example, conventional internal and external heaters, the preferred method utilizes an induction heater having coils 90, which induces a current in the tube, as described above. An inert gas, preferably nitrogen, is injected into the heated enclosure 88 through line 92 from a source of nitrogen gas under pressure 94. The tube 82 enters the heat chamber 88 through a nitrogen gas seal 96, which will be described hereinbelow. The preheated tube then enters sealed housing 98 through coupling 100. The housing 98 includes a lower reservoir 102 which is filled with molten zinc. Nitrogen gas is injected into the upper chamber of the housing through line 106. The tube then enters the galvanizing tank 108 through a conventional gasket 110. Molten zinc is pumped from the lower reservoir 102 of the housing into the galvanizing tank 108 by pump 112. The tube 82 thus enters the galvanizing tank 108 below the level of the molten zinc as shown in FIG. 1; however, nitrogen gas is injected into the upper portion of the galvanizing tank through line 106, maintaining an inert atmosphere in the galvanizing tank to reduce oxidation and dross. The tube 82 then emerges from the galvanizing tank through a nitrogen seal 116 into the upper chamber 104 of the housing and the tube is then received through a final nitrogen seal 116, which is preferably a shaping seal.

As described above, others have recognized the advantages of maintaining the galvanizing tank or pot in an inert atmosphere. However, such efforts have not been fully successful because the housing 98 must be periodically entered to replenish the zinc and for maintenance. In the galvanizing bath apparatus of this invention, however, the galvanizing tank is sealed and located within a sealed housing. Thus, the housing 98 may be entered to replenish the zinc, for example, without exposing the galvanizing tank to an oxidizing atmosphere, which would seriously damage the quality of the zinc coating on the tube. Further, it is possible to control the pressure of the inert gas in the heater 88, the housing 98 and the galvanizing tank 108. In the most preferred embodiment, the inert gas pressure in the galvanizing tank 108 is greater than the gas pressure in the housing 98, such that air or other contaminating gas will not leak back into the galvanizing tank. Similarly, the pressure in the heat chamber is greater than the pressure in the housing 98 to avoid leak back of oxidizing gas into the heat chamber.

Figure 16:
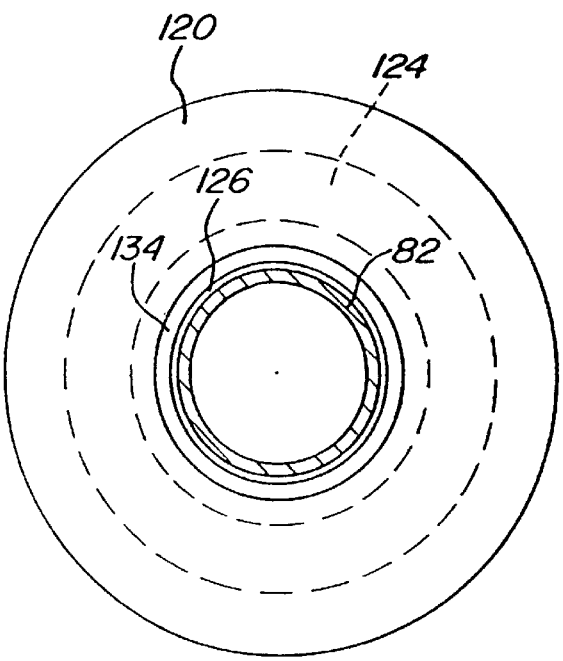
FIG. 16 is an end partial cross-sectioned view of the gas seal shown in FIG. 15, in the direction of view arrow 15—15.

FIGS. 15 and 16 illustrate a nitrogen seal 96, which may also be identical to the nitrogen seal 116. Nitrogen shaping seal 116 may be identical to the seal 96 or more preferably configured to shape the zinc coating on the tube as described in regard to FIGS. 8 and 9.

The nitrogen seal includes an inner housing member 118 and an outer housing member 120 which is axially threaded on the inner housing member 188 by the cylindrical threaded portions 122. The nitrogen seal includes an annular gas chamber 124 and a cylindrical bore 126 which closely receives the seamed tube 82 which is moving in direction of arrow 127. The annular gas chamber includes a generally cylindrical inlet portion 128 having a radial gas inlet 130 and a conical outlet portion 132, which is defined by converging cylindrical walls which taper toward an annular restricted exit or outlet 134.

An inert gas, preferably nitrogen, is received under pressure into the inlet portion 128 of the gas chamber through port 130. The gas is then accelerated through the outlet portion 132 where it is directed under pressure radially inwardly and axially over the outer surface of the tube 82, creating an inert gas barrier preventing entry of an oxidizing gas, such as the oxygen in air, from entering the heat chamber 88. Thus, the gas is directed countercurrent to the movement of the tube in the heat chamber. A similar nitrogen gas seal may be used for the seal 116. Further, the seal 116 may preferably be a nitrogen shaping seal, as described below in regard to FIGS. 8 and 9.

The remainder of the process disclosed in figure may be conventional. Following galvanizing, the tube enters a liquid cooling bath 136 where it is immersed in a coolant, such as water, at a temperature sufficiently low to substantially complete the solidification of the zinc and render the coated tubing susceptible to ready processing without damage to the galvanized surface. Following zinc solidification, the tube enters sizing and straightening rolls at 138, where the final external configuration of the tube is formed. Thereafter, the tube is flooded with an aqueous chromate solution and rinsed, further cooling and cleaning the tube. In a conventional tube mill, the tube is then marked at 142 with product identification and further markings as may be specified by the customer. A clear lacquer coat or other protective coating may then be applied at the OD paint station 144 and the tube is finally cut to length at station 146.

FIG. 7 illustrates an alternative embodiment of a galvanizing system which includes a gas shaping seal as shown in FIGS. 8 and 9. The process is, however, very similar to the galvanizing process shown in FIG. 1. The seamed steel tube 82 first enters a heat chamber 200 having a heater induction coil 202 therein, which heats the tube to the temperature of the molten zinc in the galvanizing tank 204. The heat chamber includes a nitrogen gas seal 206 which directs nitrogen gas under pressure counter-currently to the flow of the tube which is shown by arrow 208. An inert gas, preferably nitrogen, is supplied to the nitrogen seal 206 by line 208 from a source of nitrogen 210 under pressure. Nitrogen gas is also supplied under pressure through line 212 to heat chamber 200. The tube then enters the sealed galvanizing housing 214 through coupling 216. As described above, the galvanizing housing includes a lower molten zinc reservoir 218 and an upper chamber 220. Nitrogen gas is injected into the upper chamber 220 through line 222 from source 210. A conventional heat resistant pump 224 pumps molten zinc from reservoir 218 into the lower portion of the galvanizing tank or pot 204. Nitrogen gas is injected into the upper portion of the tank 204 through line 226 from source 210. The galvanizing tank further includes a plurality of overflow vents which permit the zinc to return to the reservoir 218 in a conventional manner.

As described above, the inert gas pressure in the galvanizing tank 204 is preferably greater than the inert gas pressure in the upper portion of the housing 220 and the heat chamber 200, such that an oxidizing gas does not reach the tube in the galvanizing tank. It is conventional to provide a cover 230 on the housing 214 to permit access to the housing to replenish the zinc, for example, in the reservoir 218 and for service. In such applications, however, opening the cover 230 results in flooding of the zinc pot with air and therefore oxygen. This results in poorly galvanized tube and therefore substantial waste product. Where, however, the galvanizing tank 204 and the heat chamber 200 are contiguous and separately sealed within the sealed housing 214 and the nitrogen gas in the tank is maintained at a pressure greater than the housing and heat chamber, the zinc coating on the tube is not affected by limited access to the housing.

FIGS. 8 and 9 illustrate a gas shaping seal 232 which is located at the outlet of the housing at 116 in FIG. 1 or at 232 in FIG. 7. The nitrogen shaping seal may be similar to the nitrogen seal 96 shown in FIGS. 15 and 16, except that the outlet portion 332 of the annular gas chamber 328 is eccentric to shape the molten zinc coating, as now described.

As described above in regard to FIGS. 15 and 16, the gas seal includes an inner housing member 318 and a threaded outer housing member 320 which is threaded to the inner housing member at threads 322. An annular gas chamber 324 is located between the housing members including a generally cylindrical inlet chamber 328 and an outlet chamber 332 which is defined by converging conical walls. In the embodiment of the nitrogen shaping seal 232, however, the outer conical wall 331 is eccentric to the inner conical wall, as best shown in FIG. 9. Further, the gas chamber is divided into a plurality of chambers by radial baffles 335. The disclosed embodiment includes three radial baffles which divide the gas chamber 324 into three generally axial components, each having an inlet port 330 and a gas fitting 337 as shown in FIG. 10.

The seamed metal tube 82 thus enters the gas shaping seal through cylindrical bore 326 which preferably closely receives the tube to reduce gas leakage therethrough. Nitrogen gas is then received under pressure through gas connectors 337 in each of the radial ports 330 into the inlet portion 328 of one of each of the annular gas chambers. The embodiment shown includes three chambers divided by the radial baffles 335. The gas in the lower portion of the annular exit 334a is ejected at a substantially greater pressure than the upper portion 334b. This variance in pressure shapes the molten zinc on the tube, such that the zinc coating on the upper portion of the tube is thicker than the lower portion of the tube. As the tube continues in the line, however, the zinc flows downwardly, redistributing the zinc coating to a substantially even coating, which is the desired result. As will be understood, however, where the zinc coating is initially substantially evenly distributed on the tube, gravity will cause the zinc to flow downwardly over the tube, resulting in a tube having a greater thickness in the lower portion, than in the upper portion, which is solved by the gas shaping seal of this invention. Alternatively, the gas shaping seal may be located in a separate chamber immediately following the exit of the tube from housing 214. In such embodiment, air is received under pressure in inlet chamber 328 through ports 330 and the molten coating is shaped by air pressure.

The gas pressure in the outlet portion of the nozzle (132 in FIGS. 15 and 16 and 332 in FIGS. 8 and 9) may be adjusted by relatively threading the inner and outer portions of the nozzle assembly. It is therefore possible to adjust the gas pressure exiting the nozzle, as required. For example, if the outer housing member 120 is threaded to the right in FIG. 15, the width of the annular exit 134 is reduced, increasing the velocity of the gas exiting the nozzle. Similarly, if the outer housing portion 320 is threaded to the left in FIG. 8, the semi-annular exits 334 will be increased in width, reducing the pressure of the gas exiting the shaping seal.

As will be understood by those skilled in the art, various modifications may be made to the tube forming and coating process and apparatus of this invention and the improvements may be used separately, or in combination. For example, the improved impeder 54 having an inert gas outlet at its free end may be used in a conventional tube forming mill. Further, the seamed tube formed by the process of this invention may be externally painted, rather than galvanized. The advantage of forming the seam in the lower portion of the tube rather than at the top will be particularly advantageous in a tube forming mill wherein the external surface of the tube is painted because the paint will flow downwardly over the seam and accumulate in the lower portion of the tube, as described. Similarly, the zinc coating flows downwardly over the tube, coating the seam in the galvanizing application described herein. The seam does not, however, have to be located at the exact bottom of the tube to achieve the advantages described herein. That is, the seam may be located in the lower half of the tube. More preferably, the seam is located in the bottom one-third of the tube for such applications.

We claim:

1. A continuous method of forming a seamed metal tube from a continuously moving metal strip, said tube including an exterior surface coated with a protective metal coating having a melting temperature substantially lower than the melting temperature of said metal tube, comprising the following steps:

continuously rolling and forming said metal strip into a tube-shaped strip having spaced adjacent lateral edges;

heating, melting and continuously integrally bonding said edges of said tube-shaped strip, thereby forming a continuous metal tube having a continuous longitudinal seam formed by said bonded edges;

locating said seam in a lower portion of said tube;

continuously immersing said tube in molten coating metal with said seam located in said lower portion of said tube;

removing said tube from said molten coating metal, said molten coating metal then flowing downwardly over said seam thoroughly coating said seam; and cooling said molten coating metal below the melting temperature of said molten coating metal, thereby forming a seamed metal tube having an exterior surface coated with said coating metal covering said seam.

2. The method of forming a coated metal tube as defined in claim 1, wherein said method includes flooding said tube-shaped strip with a non-oxidizing gas during heating, melting and continuously integrally bonding said edges of said strip, thereby limiting oxidation of said seam.

3. The method of forming a coated metal tube as defined in claim 1, wherein said method includes removing excess metal from said seam and roughening the exterior surface of said seam following integrally bonding of said edges of said strip, then immersing said tube in said molten coating metal and removing said tube from said molten coating metal, said molten coating metal then flowing downwardly over said roughened seam forming a good bond between said coating metal and said seam.

4. The method of forming a coated metal tube as defined in claim 1, wherein said method includes preheating said tube prior to immersing said tube in said molten coating metal.

5. The method of forming a coated metal tube as defined in claim 1, wherein said method includes spraying a coating material on the interior surface of said seam with said seam located in a lower portion of said tube following integrally bonding said edges of said strip by directing a stream of coating material downwardly over said seam.

6. The method of forming a coated metal tube as defined in claim 5, wherein said method includes locating said adjacent edges of said tube-shaped strip in a lower portion of said tube-shaped strip, then heating, melting and integrally bonding said edges, thereby forming a continuous metal tube having a continuous longitudinal seam in a lower portion of said tube prior to immersing said tube in said molten coating metal.

7. A continuous method of forming a seamed metal tube from a continuously moving metal strip, said tube including an exterior surface coated with a protective metal coating having a melting temperature substantially lower than the melting temperature of said metal tube, comprising the following steps:

- continuously rolling and forming said metal strip into a tube-shaped strip having spaced adjacent lateral edges located in a lower portion of said tube-shaped strip;
- heating, melting and continuously integrally bonding said edges of said strip, thereby forming a continuous metal tube having a continuous longitudinal seam formed by said bonded edges in a lower portion of said tube;
- removing excess metal from said seam and roughening the exterior surface of said seam;
- continuously immersing said tube in molten coating metal with said seam located in said lower portion of said tube;
- removing said tube from said molten coating metal and said molten coating metal then flowing downwardly over said roughened seam thoroughly coating said seam; and
- cooling said tube below the melting temperature of said molten coating metal, thereby freezing said molten coating metal with said molten coating metal covering said seam and bonded to said seam.

8. The method of forming a coated metal tube as defined in claim 7, wherein said method includes flooding at least said adjacent edges of said tube-shaped strip with a non-oxidizing gas during heating, melting and continuously integrally bonding said edges of said strip, thereby limiting oxidation of said seam.

9. The method of forming a coated metal tube as defined in claim 7, wherein said method includes spraying the interior surface of said seam with a protective coating material following integrally bonding said edges of said strip and cooling of said seam below the vaporization temperature of said protective coating material by directing a stream of said protective coating material downwardly over said seam.

10. A continuous method of forming a seamed metal tube from a continuously moving metal strip, said tube having interior and exterior surfaces coated with a protective coating, said method comprising the following steps:

- applying an interior coating material to one surface of said strip;
- continuously rolling and forming said metal strip into a tube-shaped strip having said interior coating material located on an interior surface thereof and said tube-shaped strip having spaced adjacent lateral edges;
- heating, melting and continuously integrally bonding said edges of said strip, thereby forming a continuous metal tube having a continuous longitudinal seam formed by said integrally bonded edges and said interior coating material on an interior surface of said tube;
- locating said seam in a lower portion of said tube;
- cooling said tube to a temperature lower than the vaporization temperature of said interior coating material;
- applying a coating to the interior surface of said seam by spraying said coating material downwardly over said interior surface of said seam;
- continuously immersing said tube in exterior molten coating metal with said seam located in said lower portion of said tube, said exterior molten coating metal having a melting temperature substantially below the melting temperature of said tube;
- removing said tube from said exterior molten coating metal, said exterior molten coating metal then flowing downwardly over the exterior surface of said seam, thoroughly coating said seam; and
- cooling said tube below the melting temperature of said exterior coating metal, thereby freezing said exterior molten coating metal and forming a tube having interior and exterior surface coated with protective coatings including the interior and exterior surfaces of said seam.

11. The method of forming a coated metal tube as defined in claim 10, wherein said method includes flooding said adjacent edges of said tube-shaped strip with a non-oxidizing gas during heating, melting and continuously integrally bonding said edges of said strip, thereby limiting oxidation of said seam.

12. The method of forming a coated metal tube as defined in claim 10, wherein said method includes removing excess metal from said seam and roughening said exterior surface of said seam following integrally bonding said edges of said tube-shaped strip, then immersing said tube in said exterior molten coating metal and removing said tube from said exterior coating metal, said exterior coating metal then flowing downwardly over said roughened exterior surface of said seam forming a good bond between said coating metal and said seam.

* * * * *